(12) United States Patent
Mitschker et al.

(10) Patent No.: US 12,169,574 B2
(45) Date of Patent: Dec. 17, 2024

(54) COMMUNICATING PRIVACY RIGHTS PERTAINING TO DATA CAPTURED BY A VEHICLE

(71) Applicant: Ford Global Technologies, LLC, Dearborn, MI (US)

(72) Inventors: Katharina Mitschker, Dearborn, MI (US); Ryan Sorsby, Canton, MI (US); David Michael Herman, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 260 days.

(21) Appl. No.: 18/049,913

(22) Filed: Oct. 26, 2022

(65) Prior Publication Data
US 2024/0143804 A1    May 2, 2024

(51) Int. Cl.
*G06F 21/62* (2013.01)
*B60K 35/00* (2024.01)
(Continued)

(52) U.S. Cl.
CPC .......... *G06F 21/6209* (2013.01); *B60K 35/00* (2013.01); *B60Q 1/50* (2013.01);
(Continued)

(58) Field of Classification Search
CPC . H04W 12/00; H04N 7/18; H04L 9/00; G06F 3/14; G06F 21/6209;
(Continued)

(56) References Cited

U.S. PATENT DOCUMENTS

| 2019/0311437 A1 | 10/2019 | Sivakumar et al. |
| 2020/0351281 A1 | 11/2020 | Ruvio et al. |

(Continued)

FOREIGN PATENT DOCUMENTS

CN    114282861 A    4/2022

OTHER PUBLICATIONS

Aneesha S, Blockchain in Automotive Industry: Amazing Applications and Use Cases of 2021, Code for Geek, NodeJS MongoDB Rest API Course.

(Continued)

*Primary Examiner* — Benjamin A Kaplan
(74) *Attorney, Agent, or Firm* — Frank Lollo; Eversheds Sutherland (US) LLP (57) ABSTRACT

The disclosure is generally directed to systems and methods associated with communicating privacy rights pertaining to data captured from a vehicle. An example method executed by a processor of a data capture apparatus in a vehicle can include capturing an image. In an example scenario, the image may include an individual who is located outside the vehicle. Furthermore, in some cases, the image can be a part of a video clip containing multiple images. The method further includes generating an identifier for identifying the image(s). The identifier can be a machine-readable symbol such as, for example, a QR-code symbol or a barcode. A notification that includes the identifier may be generated and conveyed to the individual for use by the individual to exercise his/her rights to privacy with respect to the images in which he/she is present.

20 Claims, 6 Drawing Sheets

(51) Int. Cl.
  B60Q 1/50  (2006.01)
  G06F 3/14  (2006.01)
  G06K 19/06 (2006.01)
  H04L 9/00  (2022.01)
  H04N 7/18  (2006.01)
  H04W 12/00 (2021.01)
  B60K 35/22 (2024.01)
  B60K 35/28 (2024.01)

(52) U.S. Cl.
  CPC ......... *G06F 3/14* (2013.01); *G06K 19/06028* (2013.01); *G06K 19/06037* (2013.01); *H04L 9/00* (2013.01); *H04N 7/18* (2013.01); *H04W 12/00* (2013.01); *B60K 35/22* (2024.01); *B60K 35/28* (2024.01); *B60K 2360/164* (2024.01); *B60K 2360/21* (2024.01)

(58) Field of Classification Search
  CPC ....... G06K 19/06037; G06K 19/06028; B60Q 1/50; B60K 35/00; B60K 35/22; B60K 35/28; B60K 2360/21; B60K 2360/164

USPC .......................................................... 726/26
  See application file for complete search history.

(56) References Cited

U.S. PATENT DOCUMENTS

| | | | |
|---|---|---|---|
| 2023/0147115 A1* | 5/2023 | Hagen ................... | H04W 4/021 348/148 |
| 2023/0292133 A1* | 9/2023 | Davidson, Jr. ........ | H04W 12/06 |
| 2023/0412915 A1* | 12/2023 | Fransson ................ | H04N 23/60 |

OTHER PUBLICATIONS

What Problems Does Blockchain Solve for the Automotive Sector, Blockedge, 1-6.

Dongjun Na, et al., Blockchain-Based Dashcam Video Management Method for Data Sharing and Integrity in V2V Network, IEEE Access, Jan. 5, 2022, 1-14.

* cited by examiner

COMMUNICATING PRIVACY RIGHTS PERTAINING TO DATA CAPTURED BY A VEHICLE

BACKGROUND

A vehicle may be used sometimes for obtaining data pertaining to objects that are of interest for various purposes, such as, for example, for capturing images of roads, houses, and streets for purposes of cartography. However, in at least some cases, the captured images may include one or more individuals. Capturing an image of an individual without his/her consent be undesirable in some scenarios. Consequently, it is desirable to address this issue.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

In terms of a general overview, embodiments described in this disclosure are generally directed to systems and methods associated with communicating privacy rights pertaining to data captured from a vehicle. An example method executed by a processor of a data capture apparatus in a vehicle may include initiating a data capture procedure for capturing at least one image that includes an individual located outside the vehicle. In an example scenario, the image can be a part of a video clip containing multiple images. The method further includes generating, upon initiating the data capture procedure, an identifier for identifying the image(s). The identifier can be a machine-readable symbol such as, for example, a QR-code symbol or a barcode. In an example scenario, a notification that includes the identifier may be generated and displayed on a display screen that is viewable by the individual, which may be mounted in the cabin of the vehicle or on a body panel or portion of the vehicle. The notification may be discontinued upon termination of the data capture procedure. In another example scenario, the notification may be transmitted to a personal device of the individual (a smartphone, for example). The identifier may be used by the individual to exercise his/her rights to privacy with respect to the images in which he/she is present.

ILLUSTRATIVE EMBODIMENTS

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, it must be understood that the word "object" as used herein with respect to images encompasses various inanimate objects outside a vehicle (buildings, statues, structures, etc.), natural objects outside a vehicle (trees, mountains, waterfalls, rivers, animals, birds, etc.), and scenery outside a vehicle (sunset, sunrise, etc.). Words such as "image" and "photograph" may be used herein in an interchangeable manner. More particularly, the word "image" as used herein is merely one example of "data" in accordance with the disclosure. Other forms of data may include sensor signals captured by use of various types of sensors provided in a vehicle (infrared sensors, motion detectors, etc.). The images/photographs referred to herein in accordance with the disclosure may be obtained by use of various types of image capture devices (still camera, digital camera, video camera, smartphone, etc.). The various forms of images/photographs can include still photographs, video clips, real-time video, movies, still frames etc. A still frame is a single static image that may be obtained from a video clip or a video stream. A video clip is generally composed of a set of images that are captured sequentially over a period of time. Thus, a description below with respect to a single image is equally applicable to a video clip for example. Labels such as "barcode," "QR code" and "symbol" may be used interchangeably in this disclosure and must be understood to refer to various types of machine-readable codes.

The word "vehicle" as used in this disclosure can pertain to any one of various types of vehicles such as, for example, cars, vans, sports utility vehicles, trucks, electric vehicles, gasoline vehicles, and hybrid vehicles. Furthermore, the description provided herein is applicable to various vehicles incorporating various kinds of driving automation such as, for example, the six levels of driving automation that is defined by the Society of Automotive Engineers (SAE) as ranging from Level 0 (fully manual) to Level 5 (fully autonomous).

It must also be understood that words such as "implementation," "application," "scenario," "case," and "situation" as used herein are an abbreviated version of the phrase "In an example ("implementation," "application," "scenario," "case," "approach," and "situation") in accordance with the disclosure." It must also be understood that the word "example" as used herein is intended to be non-exclusionary and non-limiting in nature.

Figure 1:
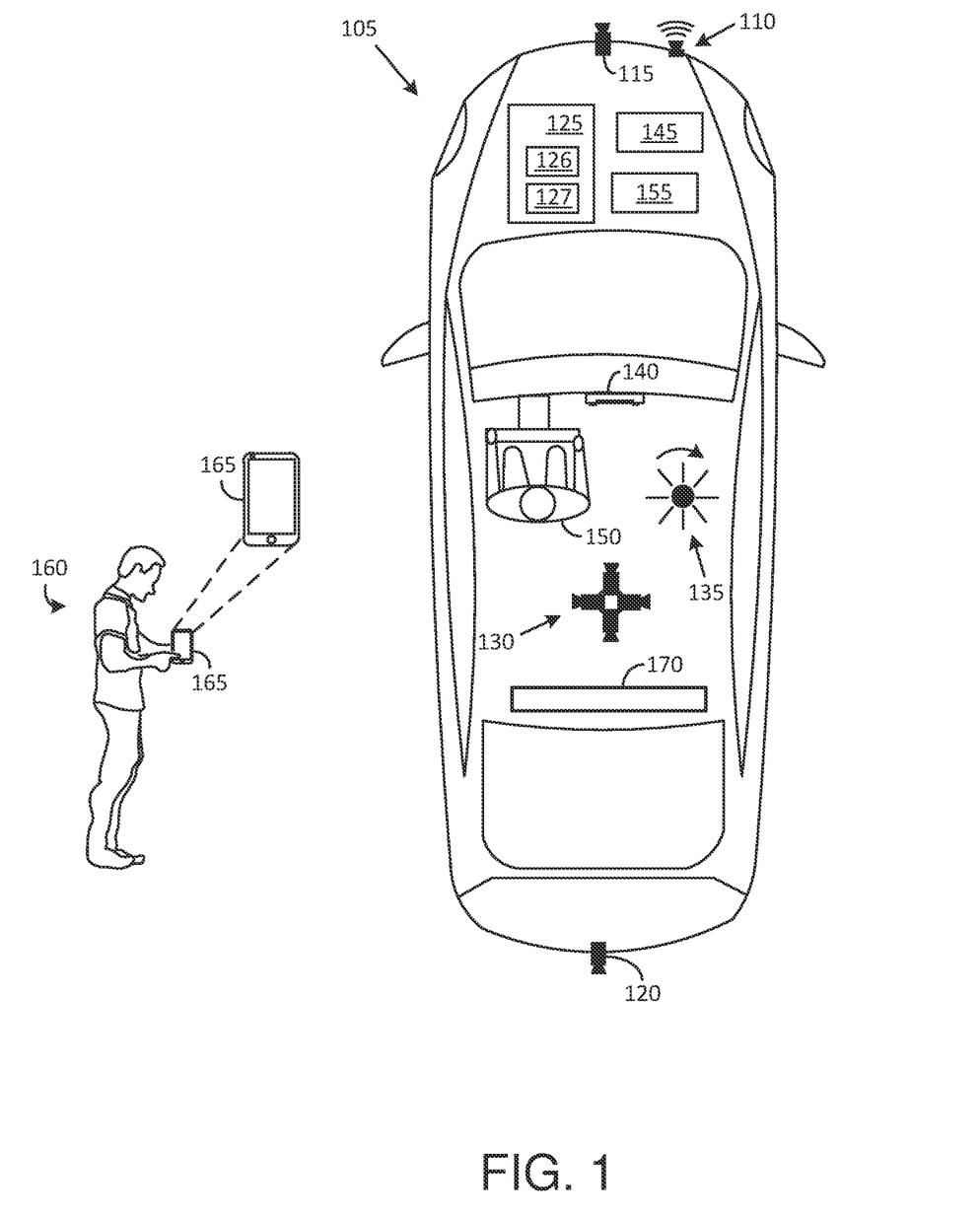
FIG. 1 shows an example vehicle that includes a data capture apparatus in accordance with an embodiment of the disclosure.

FIG. 1 shows a vehicle 105 that includes a data capture apparatus 125 in accordance with an embodiment of the disclosure. In the illustrated example scenario, the vehicle 105 is a sedan but it must be understood that the vehicle 105 can be any of various types of vehicles such as, for example, a van or a truck. The data capture apparatus 125 can include a processor 126 that is configured to execute computer-executable instructions stored in a memory 127 for performing various operations in accordance with the disclosure. Some example operations are described below.

The vehicle 105 may further include components such as, for example, a vehicle controller 145, a communications system 155, an infotainment system 140, a loudspeaker 110, a notification light 135, and various data capture devices. In the illustrated example implementation, data capture can be carried out by the data capture apparatus 125 by operating one or more cameras (such as, for example, a camera 115, a camera 120, and a camera 130). These components may be communicatively coupled to each other, and to the data capture apparatus 125, wirelessly and/or via wired connections. Other data capture devices (not shown) that are operable by the data capture apparatus 125 can include sensors and detectors such as, for example, infrared detectors, motion detectors, distance sensors, proximity sensors, and audio sensors. The data obtained by operating the various data capture devices can be used by the data capture apparatus 125 and/or by other computing devices that are communicatively coupled to the data capture apparatus 125 for various purposes in accordance with the disclosure.

In an example implementation, a captured image that includes the individual 160 can offer various types of information of the individual 160 that may, or may not, be used by the data capture apparatus 125. For example in some cases, height information, weight information, and movement characteristics (walking style, gait, etc.) of the individual 160 may be considered as incidental information and ignored by the data capture apparatus 125. In some other cases, such information may be evaluated in a generic or holistic manner by the data capture apparatus 125 keeping in view privacy rights of the individual 160 (and one or more other individuals if present in an image). One example of evaluating data in a generic or holistic manner may pertain to obtaining pedestrian-related information such as, for example, to determine a density of foot traffic on a sidewalk, to determine a rate of flow of foot traffic on a sidewalk, or time-related information about pedestrians using a crosswalk. In at least some scenarios, pedestrian-related information may be obtained by evaluating sensor data (object detector data, motion detector data, etc.) in lieu of, or in combination, with images.

The vehicle controller 145 may be operated to execute various operations related to the vehicle 105, such as, for example, controlling engine operations (fuel injection, speed control, emissions control, braking, etc.), managing climate controls (air conditioning, heating etc.), activating airbags, and issuing notification (check engine light, bulb failure, low tire pressure, etc.), and also for executing various operations in accordance with disclosure.

In the illustrated example scenario, the vehicle 105 is a driver-operated vehicle and the vehicle controller 145 responds to actions performed by a driver 150 (such as, for example, reducing the speed of the vehicle 105 when the driver 150 executes a braking operation, moving the vehicle 105 at a cruising speed when the driver 150 applies cruise control, and selecting an appropriate gear when the driver 150 actuates the accelerator or brakes).

In another example scenario, the vehicle 105 is an autonomous vehicle and the vehicle controller 145 performs some or all of various operations that may replicate those performed by the driver 150. The vehicle controller 145 of the autonomous vehicle can be configured to perform various operations associated with capturing data and offering privacy rights in accordance with the disclosure. Capturing data can include, for example, the vehicle controller 145 independently, or in cooperation with the data capture apparatus 125, configuring a camera to capture an image, followed by operating the camera to capture an image.

The infotainment system 140 may include a combination of various entertainment items (such as a radio, streaming audio solutions, etc., and USB access ports for digital audio devices). The infotainment system 140 may also include other types of items, such as, for example, a navigation system and a graphical user interface (GUI) that is displayed on a display screen. The driver 150 may use the GUI for interacting with the data capture apparatus 125 for capturing various images such as, for example, a photograph, a video clip, or real-time video of individuals and objects located outside the vehicle 105.

The cameras installed on the vehicle 105 can be any of various types of image capture devices such as, for example, a digital camera that captures a still image, a video camera that captures a video clip, a video camera that captures real-time video, and/or an infrared camera. Each of the cameras may be mounted at any of various locations on the vehicle 105. In the illustrated implementation, each of the camera 130, the camera 115, and the camera 120 is mounted upon a body portion of the vehicle 105 in a manner that allows the cameras to be operated for capturing images of objects located outside the vehicle 105.

More particularly, in the illustrated example, the camera 130 is an image capture device that is mounted on the roof the vehicle 105 and provides a 360-degree field of view for capturing images of objects located around the outside of the vehicle 105. The images are conveyed to the data capture apparatus 125 for executing various operations in accordance with the disclosure. When the vehicle 105 is an autonomous vehicle, the camera 130 may be further configured to convey images to the vehicle controller 145 and to enable the vehicle controller 145 to autonomously control the operation of the camera 130.

The camera 115 may be mounted upon a front portion of the vehicle 105 (for example, on a front bumper, behind a grille, on the front windshield, etc.) and configured for capturing images of objects located in front of the vehicle 105. The camera 120 may be mounted upon a rear portion of the vehicle 105 (for example, on a rear bumper, on a trunk, on a license plate etc.) and configured for capturing images of objects located behind the vehicle 105. Images captured by the camera 115 and the camera 120 may be conveyed to the data capture apparatus 125 for performing various actions in accordance with the disclosure.

When the vehicle 105 is an autonomous vehicle, images captured by the camera 130, the camera 115 and/or the camera 120 may be conveyed to the vehicle controller 145 to enable the vehicle controller 145 to autonomously control the movement of the vehicle 105 (e.g., navigation, incident, etc.).

In an example implementation of the disclosure, one or more of the cameras can be controlled by the driver 150 for capturing images that are conveyed by the cameras to the data capture apparatus 125 for various purposes in accordance with the disclosure. In another example implementation, one or more of the cameras can be controlled by the data capture apparatus 125 either in cooperation with the driver 150 (when present) or independently such as, for example, when the vehicle 105 is an autonomous vehicle or when the image capture process is automated. The captured images can be used for various purposes in accordance with the disclosure.

In an example application, the data capture apparatus 125 and one or more cameras can be configured for capturing images and operating upon the images as a part of a cartographic operation for generating various types of maps and views such as, for example, maps and views provided by Google Maps® and Google Street View®.

An example imaging operation in accordance with the disclosure can include operating the camera 130 for capturing a panoramic view (≤360 degrees) of various objects (man-made objects, natural objects, animate objects, inanimate objects, etc.) that may be present outside the vehicle 105. In some instances, one or more of the captured images may include one or more individuals who may be present outside the vehicle 105. For example, a captured image can include an individual 160 who is shown in FIG. 1. In the illustrated example scenario, the individual 160 is a pedestrian holding a personal device 165 (a smartphone, in this example).

The individual 160 may, or may not, be aware that his/her image is being captured by one or more cameras of the vehicle 105. It is often desirable, when capturing an image of the individual 160 to provide notification to the individual 160 to mitigate the risk of possible violations of the privacy rights of the individual 160, which may vary from state to state and country to country. Consequently, in accordance with the disclosure, the data capture apparatus 125 is configured to notify the individual 160 of the imaging operation taking place and how to exercise his/her privacy rights with respect to captured images in which the individual 160 is present.

In an example implementation, the data capture apparatus 125 notifies the individual 160 of an image capture operation by issuing a visual and/or an audible alert. One example of a visual alert is the use of the notification light 135. The notification light 135 can be, for example, a rotating orange light that draws the attention of the individual 160. The notification light 135 can be mounted on various parts of the vehicle 105 such as, for example, on a roof of the vehicle 105 adjacent to the camera 130 (as illustrated in FIG. 1) or on top of the camera 130.

An audible alert may be issued via an audio device such as, for example, the loudspeaker 110. In this case, the data capture apparatus 125 may convey an audio signal to the loudspeaker 110 for producing a beeping sound that can alert the individual 160 of an image capture operation.

In another example implementation, the data capture apparatus 125 notifies the individual 160 of an image capture operation by displaying a notification on a display screen of the infotainment system 140 and/or on a display screen 170 that is visible from outside the vehicle 105. The display screen that is visible from outside the vehicle 105 can be, for example, mounted on a side panel of the vehicle 105 (when the vehicle 105 is a van, for example), on a window of the vehicle 105, or on a rear portion of the vehicle 105.

The notification can include, for example, a message that provides information about the image capture operation in progress. The notification can further include an identifier that the individual 160 can use to access information pertaining to the captured images and to exercise his/her privacy rights with respect to the captured images. In an example implementation, the identifier can be a machine-readable code (such as, for example, a Quick Response (QR) code or a barcode), a numerical code, or a text code (an access code or a code word, for example). The machine-readable code, numerical code or text code can be used by the individual 160 to communicate with devices such as the data capture apparatus 125, a server computer (not shown), and/or a cloud computer (not shown) for obtaining information pertaining to the captured images.

When used, the machine-readable code may be scanned by the individual 160 (by use of the personal device 165, for example) to obtain information about how to access devices such as the data capture apparatus 125, the server computer, distributed ledger, and/or the cloud computer. In an example scenario, scanning the machine-readable code can provide a uniform resource locator (URL) of the data capture apparatus 125, the server computer, or the cloud computer. The URL may be used by the individual 160 for communicating with the data capture apparatus 125, the server computer, or the cloud computer, via the Internet.

In another example implementation, the data capture apparatus 125 notifies the individual 160 of an image capture operation by conveying a notification in the form of a text message to the personal device 165. The text message can include, for example, a URL and an identifier that the individual 160 can use to access information pertaining to the captured images and to exercise his/her privacy rights with respect to the images. In an example implementation, the identifier can be a numerical code or a text code (an access code or a code word, for example) that is included in the text message. The URL may be used by the individual 160 to access the data capture apparatus 125, the server computer, and/or the cloud computer. The numerical code or text code can be used for obtaining information pertaining to the captured images in which the individual 160 is present.

Figure 2:
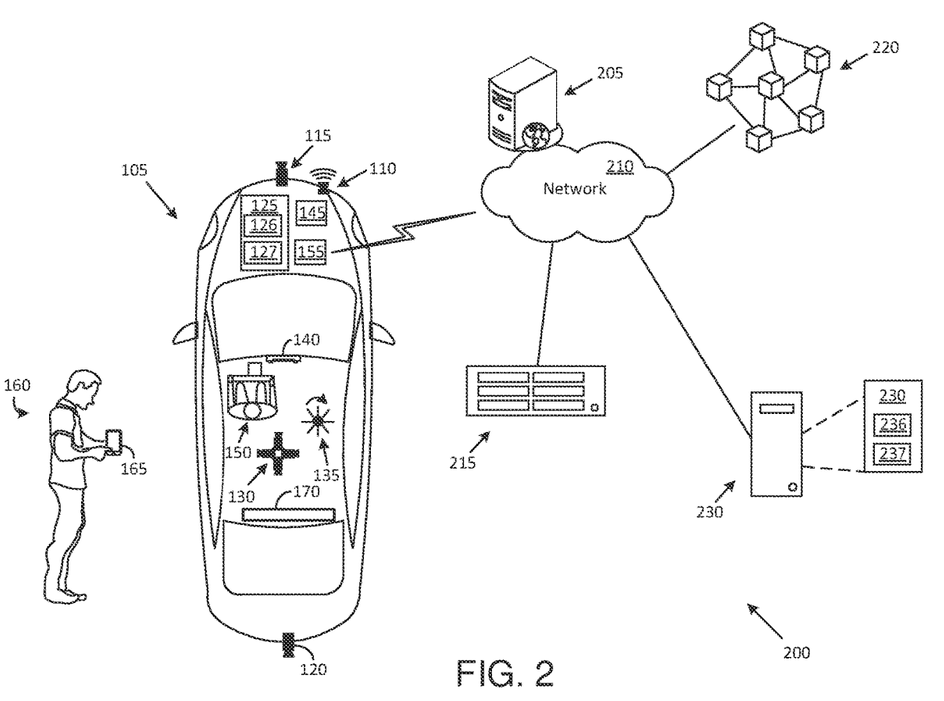
FIG. 2 shows an example system that includes the data capture apparatus provided in the vehicle shown in FIG. 1.

FIG. 2 shows an example system 200 that includes the data capture apparatus 125 provided in the vehicle 105. In this example scenario, the communications system 155 of the vehicle 105 is configured to wirelessly communicate with various devices such as, for example, a computer 230, a cloud computer 205, a storage device 215, and a computer system 220. In the illustrated example, the computer system 220 has a distributed computing architecture that includes multiple computers.

The wireless communications may be carried out via a network 210, which may include any one, or a combination of networks, such as, for example, a local area network (LAN), a wide area network (WAN), a telephone network, a cellular network, a cable network, a wireless network, and/or private/public networks such as the Internet. At least one portion of the network 210 includes a wireless communication link such as, for example, a cellular communication link, a WiFi communications link, an ultra-wideband (UWB) communication link, and a Bluetooth® communication link, that allows the communications system 155 of the vehicle 105 to communicate with the personal device 165 of the individual 160.

The computer 230 can be any of various types of computers such as, for example, a server computer, a client device, a personal computer, and/or a distributed computer (multiple computers operating in cooperation with each other as a single computing entity). In the illustrated scenario, the computer 230 includes a processor 236 that is configured to execute computer-executable instructions stored in a memory 237 for performing various operations in accordance with the disclosure. It must be understood that various operations described herein with respect to the data capture apparatus 125 provided in the vehicle 105, particularly with reference to providing privacy rights to one or more individuals who may be included in images captured by the vehicle 105, can be executed by the computer 230 either independently or in cooperation with the data capture apparatus 125 of the vehicle 105 in accordance with the disclosure.

The cloud computer 205 may be used by the data capture apparatus 125 to execute various operations in accordance with the disclosure. It must be understood that various operations described herein with respect to the data capture apparatus 125 provided in the vehicle 105, particularly with reference to providing privacy rights to one or more individuals who may be included in images captured by the vehicle 105, can be executed by the cloud computer 205 either independently or in cooperation with the data capture apparatus 125 of the vehicle 105 in accordance with the disclosure.

The storage device 215 may be configured to store images generated in accordance with the disclosure, and accessible by individuals such as, for example, the individual 160, in the manner described above (using an URL, identifier, etc.).

In an example implementation, the computer system 220 having the distributed computing architecture is configured to host a distributed ledger. The distributed ledger can incorporate a block chain architecture that provides access to personal information in a secure manner. For example, the block chain architecture allows a first individual to obtain personal information associated with the first individual and prevents the first individual from accessing personal information associated with a second individual. The block chain architecture also offers information integrity by ensuring accountability in operations such as deletions, edits, and insertions. Further, the distributed ledger may incorporate other meta-data in a given entry to provide an individual to search, validate, and prove they have a legal right to the specific PII data element. For example, the distributed ledger, my incorporate information on time, date, and location of PII data collection. Said meta-data may be obfuscated via a cryptographic hash function to protect the privacy of the data collected and individuals while allowing search and other functionalities. The specific architecture and schema of the distributed ledger embodiment may vary as is known in the arts (e.g., private, public, permissioned, permissionless, Hashgraph, DAG distributed ledger, Holochain, etc.)

Figure 3:
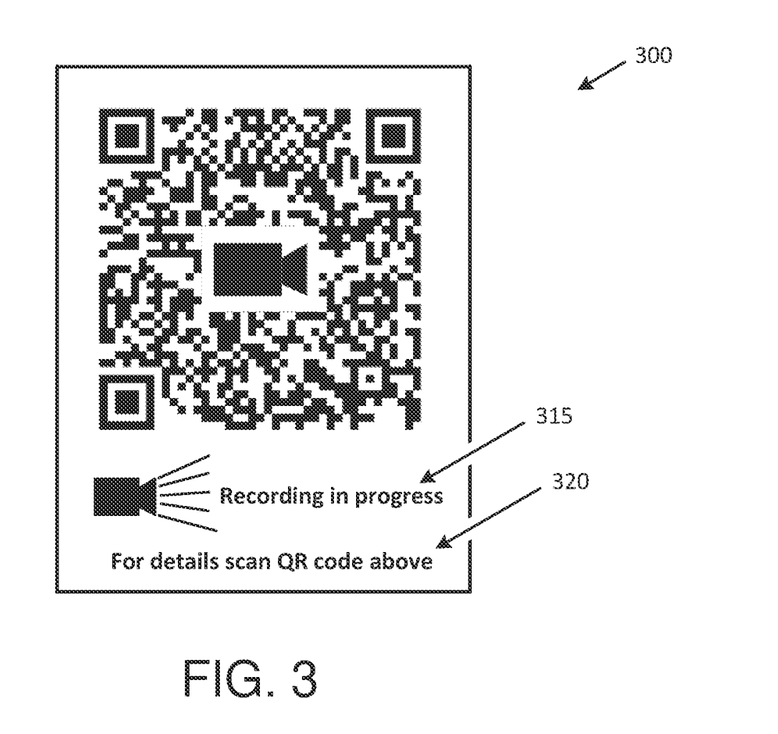
FIG. 3 shows an example identifier that may be generated by the data capture apparatus in accordance with an embodiment of the disclosure.

FIG. 3 shows an example identifier that may be generated by the data capture apparatus 125 in accordance with an embodiment of the disclosure. The example identifier is a machine-readable symbol, in this case, a quick response (QR) code 300. The QR code 300 may be configured to provide various types of information such as, for example, a URL of the data capture apparatus 125, a URL of the computer 230, a URL of the storage device 215, and/or a URL of the computer system 220.

In an example implementation, the QR code 300 is provided in a standard format with no additional content (such as an icon, a label, or text). In another example implementation, the QR code 300 can have a custom format such as, for example, by inclusion of one or more camera icons, a text instruction 315, and a text instruction 320 as illustrated in FIG. 3.

In an example implementation, the QR code 300 may be generated by the data capture apparatus 125 upon initiation of an image capture operation that produces one or more images in which the individual 160 is present. In another example implementation, the QR code 300 may be generated by the data capture apparatus 125 upon detecting the presence of the individual 160 near the vehicle 105. In yet another implementation, the QR code 300 may be generated by the data capture apparatus 125 upon evaluating a captured image and detecting a presence of the individual 160 in the captured image.

The QR code 300 may then be displayed upon a display screen of a device such as, for example, a display screen of the infotainment system 140 and/or on a display screen that is visible from outside the vehicle 105. The data capture apparatus 125 may discontinue displaying of the QR code 300 when the image capture operation is stopped. A different QR code is generated upon initiation of a subsequent image capture operation in which the individual 160 may, or may not, be present. Thus, each QR code can be uniquely associated with each respective video recording, image capture session, and/or image.

Figure 4:
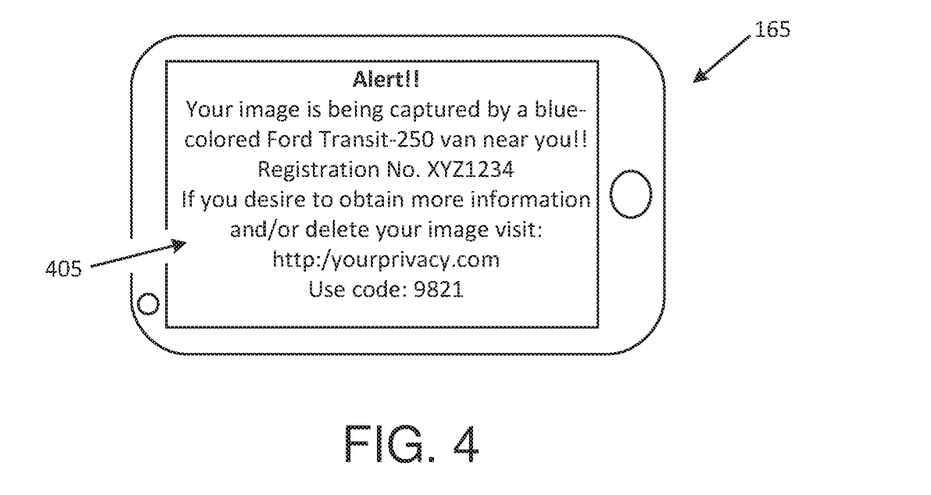
FIG. 4 shows an example text message that may be generated by the data capture apparatus in accordance with an embodiment of the disclosure.

FIG. 4 shows an example text message 405 that may be generated by the data capture apparatus 125 in accordance with an embodiment of the disclosure. The text message 405 may be wirelessly transmitted by the data capture apparatus 125 to the personal device 165 that is shown in FIG. 4. In this example, the text message 405 provides an alert that includes a description of the vehicle that is capturing images and instructions on how to access a website for exercising privacy rights if so desired.

Also included in the text message 405, is an identifier for use by the individual 160 to exercise his/her privacy rights. In the illustrated example, the identifier is a code number (9821 in this example). In another example, the identifier can be a code word.

In an example implementation, the code number (or code word) may be generated by the data capture apparatus 125 upon initiation of an image capture operation that produces one or more images in which the individual 160 is present. In another example implementation, the code number (or code word) may be generated by the data capture apparatus 125 upon detecting the presence of the individual 160 near the vehicle 105. In yet another implementation, the code number (or code word) may be generated by the data capture apparatus 125 upon evaluating a captured image and detecting a presence of the individual 160 in the captured image.

A different code number (or code word) is generated upon initiation of a subsequent image capture operation in which the individual 160 may, or may not, be present. Thus, each code number (or code word) can be uniquely associated with each respective video recording, image capture session, and/or image.

Figure 5:
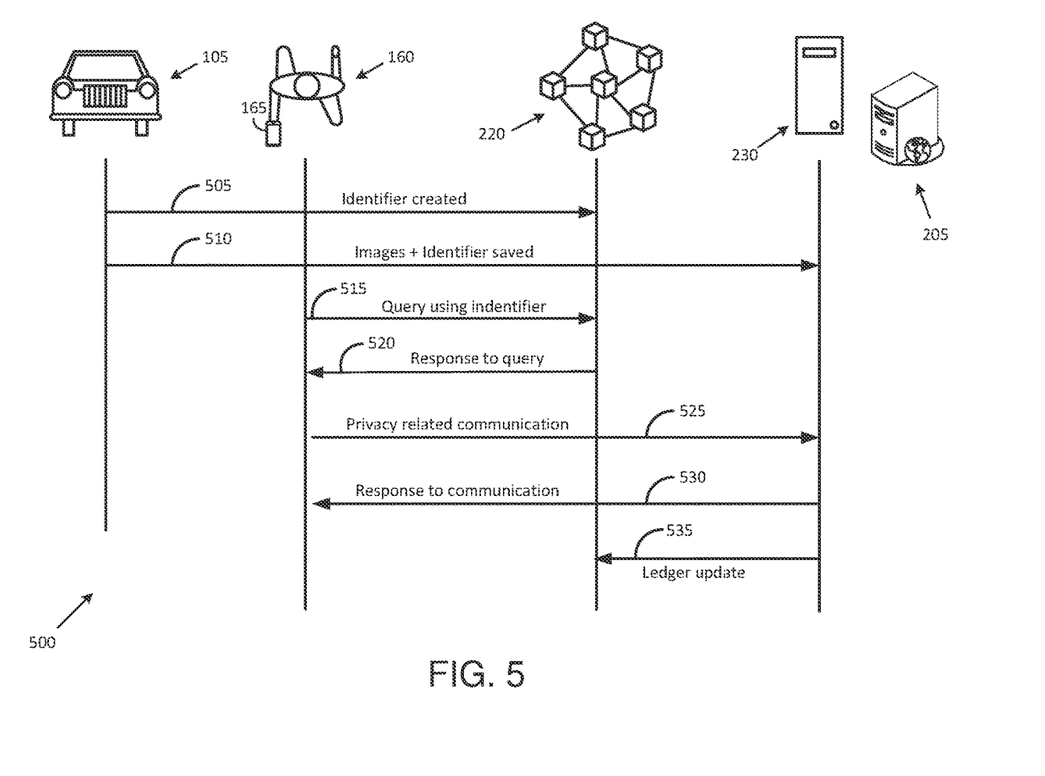
FIG. 5 illustrates a sequence diagram of a process for providing privacy protection in accordance the disclosure.

FIG. 5 illustrates a sequence diagram 500 of a process for providing privacy protection in accordance the disclosure. More particularly, the sequence diagram 500 illustrates a sequence of operations that can be implemented in hardware, software, or a combination thereof. In the context of software, the operations represent computer-executable instructions stored in one or more non-transitory computer-readable media such as, for example, the memory 127 provided in the data capture apparatus 125, that, when executed by one or more processors such as the processor 126 provided in the data capture apparatus 125, perform the recited operations. Some of the operations represent computer-executable instructions stored in a memory 237 of the computer 230, and one or more memory devices provided in one or more computers of the computer system 220. The sequence diagram 500 is described below by referring to some of the objects illustrated in FIGS. 1 through 4 (vehicle 105, individual 160, etc.). However, it must be understood that the described operations and concepts are equally applicable to any of various other objects and scenarios.

Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. Some or all of the operations described in the sequence diagram 500 may be carried out by the data capture apparatus 125 either independently or in cooperation with other devices such as, for example, the vehicle controller 145, the personal device 165 of the individual 160, the computer 230, the computer system 220, and the storage device 215. In some cases, the operations described below with respect to the computer system 220, the computer 230, and/or the cloud computer 205 can be performed exclusively by the data capture apparatus 125 of the vehicle 105.

Operation 505 pertains to a data capture operation initiated by the data capture apparatus 125 of the vehicle 105. The data capture operation in this example, is an image capture operation. Upon starting the image capture operation, the data capture apparatus 125 generates an identifier such as, for example, the QR code 300 or the text message 405 described above.

The data capture apparatus 125 may then transmit the identifier to the computer system 220. In an example implementation, the computer system 220 is configured to operate as a distributed ledger that supports a block chain architecture. The block chain architecture offers information integrity by ensuring accountability in operations such as deletions, edits, and insertions. In an example case, an identifier associated with an individual may be encoded and stored in the distributed ledger. One example of an encoding procedure is a cryptographic hashing procedure that converts information in a native format to an encoded format. Accordingly, for example, rather than storing an image in a native image format, information associated with the image may be stored in the form of a vector value or a set of binary values. The vector value is searchable by an individual. However, image information associated with the vector value cannot be tampered with, due to the block chain architecture. Additional information in the form of metadata may also be used for storing identifiers such as, for example, in the form of separate entries for each characteristic of an individual (face, name, address, etc.) and for each vehicle parameter (registration information, make, model, color, etc.).

The information may be stored in various ways including, for example, in a structural format (a tree format, for example) and/or in the form of information datasets, subsets, and numerical values. The information may be searchable by an individual by use of nomenclature associated with the structural format.

Operation 510 indicates a transmission of one or more images captured by the data capture apparatus 125 (digital images, video clip, etc.) along with one or more respective identifiers. The images and identifiers may be transmitted to the computer 230. The computer 230 can be configured to store the images and the respective identifiers in a manner that allows for retrieval of an image (or images) based on association of the image (or images) with a respective identifier. Thus, for example, a first image can be retrieved by a device such as, for example, the personal device 165 of the individual 160, by use of a first identifier that is associated with the first image, and a second image can be retrieved by use of a second identifier that is associated with the second image.

In another example implementation, the images and identifiers may be transmitted by the data capture apparatus 125 to the cloud computer 205. It should be understood that the description below with respect to the computer 230 is equally applicable to the cloud computer 205.

Operation 515 indicates a query that may be originated by the individual 160 by use of the personal device 165 and transmitted to the computer 230 (or cloud computer 205). The query may be directed at identifying one or more identifiers that may be applicable to the individual 160 and stored in the computer system 220 (via operation 505).

In an example implementation, the query may be based on the individual 160 providing information such as, for example, a description of the vehicle 105 that captured images, a date of occurrence of the image capture, a time and date of occurrence of the image capture, a location where the image capture occurred (address, description of location, a description of the locale, a description of objects present at the locale, etc.), and/or a personal characteristic of the individual 160. The personal characteristic of the individual 160 can include, for example, an image of the individual 160 or a description of the individual 160 (age, physical features, race, country of origin, etc.). The query may also be based on items such as a vector identifier or labels such as those described above.

In another example implementation, the query may be based on key words, search terms, and/or search procedures used for conducting a search by use of a search engine (such as, for example, JumpStation®, Google® or DuckDuckGo®) or for locating an image in an image database (such as, for example, Google Photos® or Flickr®).

In yet another example implementation, the query may be based on information received by the personal device 165 from the data capture apparatus 125, and particularly based on an identifier such as, for example, the QR code 300 described above or the code number (Code 3.1415926, for example) included in the text message 405 described above.

Operation 520 indicates a response to the query originated by the individual 160. In an example implementation, the response provides information about the stored images associated with the query. The information can include, for example, accessing information (URL, password, etc.) that can be used by the individual 160 to access the images stored in the computer 230 (or the cloud computer 205).

Operation 525 indicates a communication originated by the individual 160 (by use of the personal device 165 or any other device such as, for example, a laptop computer or a desktop computer) for accessing the images stored in the computer 230 (or the cloud computer 205). The individual 160 may examine one or more of the stored images, particularly those in which he/she is present, and carry out one or more actions. In an example scenario, the individual 160 may find the inclusion of his/her images acceptable and may decide not to take any action in the matter. In another example scenario, the individual 160 may decide to make a privacy request to delete one or more stored images in which he/she is present or object to the processing of their data. In this case, the computer 230 may verify the validity of the request by evaluating the images to determine the presence of the individual 160 in the images. The computer 230 may further assess an impact of deleting the images upon an intended goal of the data capture procedure carried out by the data capture apparatus 125. In some cases, the goal may be compromised if the images were to be deleted in their entirety. In such cases, the computer 230 may carry out photo editing operations to provide privacy to the individual 160 (making pixels fuzzy, applying black rectangles/squares, selectively deleting a portion of the image in which the individual 160 is present, etc.). After editing, the computer 230 may seek approval of the individual 160 to retain the edited images. If the individual 160 provides approval, the edited images are saved. However, if the individual 160 denies approval, the edited images are deleted by the computer 230.

In yet another example scenario, the computer 230 may respond to the request by deleting the images irrespective of compromising the goal of the data capture procedure carried out by the data capture apparatus 125.

Operation 530 pertains to the computer 230 informing the individual 160 of actions performed upon the image (editing or deleting, for example).

Operation 535 pertains to a ledger update action that may be carried out upon the ledger that may be stored in the computer system 220. The ledger update operation can include, for example, deletion of one or more identifiers associated with one or more deleted images.

Figure 6:
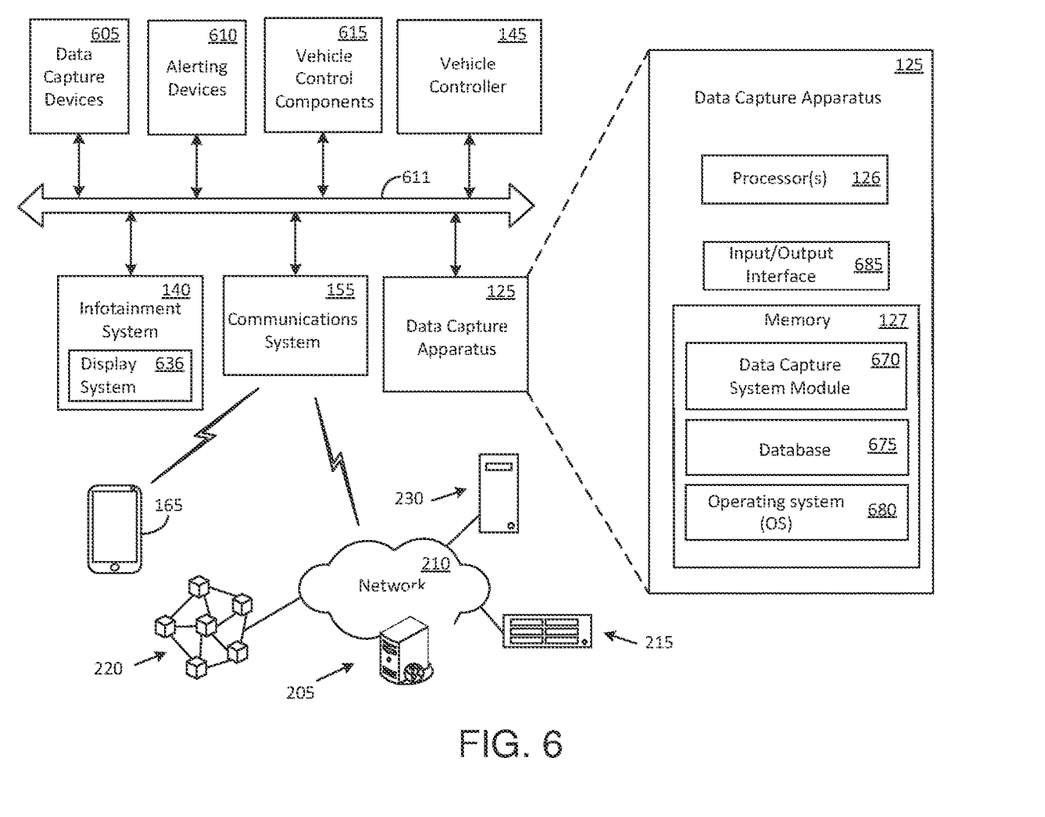
FIG. 6 shows some functional components that may be included in a vehicle that includes a data capture apparatus in accordance with an embodiment of the disclosure.

FIG. 6 shows some functional components that may be included in a vehicle (the vehicle 105, for example) in accordance with an embodiment of the disclosure. The example components can include data capture devices 605, alerting devices 610, vehicle control components 615, the vehicle controller 145, the infotainment system 140, the communications system 155, and the data capture apparatus 125. The various components are communicatively coupled to each other via one or more buses such as an example bus 611. The bus 611 may be implemented using various wired and/or wireless technologies. For example, the bus 611 can be a vehicle bus that uses a controller area network (CAN) bus protocol, a Media Oriented Systems Transport (MOST) bus protocol, and/or a CAN flexible data (CAN-FD) bus protocol. Some or all portions of the bus 611 may also be implemented using wireless technologies such as Bluetooth®, Ultra-Wideband, Wi-Fi, Zigbee®, or near-field-communications (NFC). In an example implementation, a Matter protocol, which is a unifying, IP-based connectivity protocol may be used. The Matter protocol provides interoperability among various devices including artificial intelligence robots, drones, and Internet-of-Things (IoT) platforms.

The infotainment system 140 can include a display system 636 having a GUI for carrying out various operations. The GUI may be used, for example, by the driver 150 to interact with the data capture apparatus 125 and to execute actions associated with privacy rights.

The data capture devices 605 can include various types of sensors, detectors, and/or cameras (such as, for example, the camera 115, the camera 120, and the camera 130 that are shown in FIG. 1).

The alerting devices 610 can be used for alerting an individual located outside the vehicle 105 of an image capture operation. A few example alerting devices can include the loudspeaker 110 and the notification light 135. In another example, alerting method may be the use of a public distributed ledger itself.

The vehicle control components 615 can include various components and systems associated with driving functions of the vehicle 105 (such as, for example, the engine, brakes, accelerator, and fuel injection) and various other functions such as controlling the cameras provided in the vehicle 105. The vehicle controller 145 can control at least some of the vehicle control components 615 for controlling certain operations of the vehicle 105 when the vehicle 105 is an autonomous vehicle.

The communications system 155 can include various components such as, for example, a wireless transmitter, a wireless receiver, and/or a wireless transceiver, that are configured to allow the data capture apparatus 125 to communicate with devices such as, for example, the personal device 165, the computer 230, the cloud computer 205, the computer system 220, and the storage device 215. The communications may be carried out via wireless signals either directly or via the network 210 by use of any of various communication formats such as, for example, WiFi, cellular, TCP/IP, Bluetooth®, Ultra-Wideband, Wi-Fi, Ultra-Wideband (UBW), Zigbee®, and near-field-communications (NFC).

In one implementation, the data capture apparatus 125 can be an independent device (enclosed in an enclosure, for example). In another implementation, some or all components of the data capture apparatus 125 can be housed, merged, or can share functionality, with the vehicle controller 145. For example, an integrated unit that combines the functionality of the data capture apparatus 125 with that of the vehicle controller 145 can be operated by a single processor and a single memory device. In the illustrated example configuration, the data capture apparatus 125 includes the processor 126, an input/output interface 685, and the memory 127.

The input/output interface 685 is configured to provide communications between the data capture apparatus 125 and other components such as the data capture devices 605 (for receiving images from the cameras, for example).

The memory 127, which is one example of a non-transitory computer-readable medium, may be used to store an operating system (OS) 680, a database 675, and various code modules such as a data capture system module 670. The code modules are provided in the form of computer-executable instructions that can be executed by the processor 126 for performing various operations in accordance with the disclosure.

The database 675 may be used to store information such as, for example, images captured by use of the data capture devices 605 and images obtained from, or for transmitting to, the computer 230, the cloud computer 205, the computer system 220, and the storage device 215.

The data capture system module 670 may be executed by the processor 126 for performing various operations in accordance with the disclosure, including, execution of some operations of the example sequence diagram 500 described above.

Figure 7:
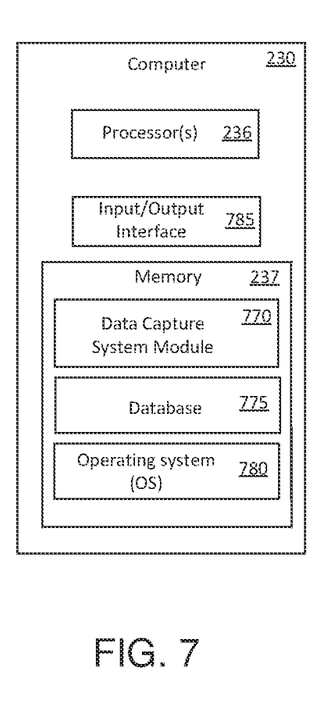
FIG. 7 shows some functional components that may be included in a computer that interacts with a data capture apparatus in accordance with an embodiment of the disclosure.

FIG. 7 shows some functional components that may be included in the computer 230 in accordance with an embodiment of the disclosure. The example components can include the processor 236, an input/output interface 785, and the memory 237.

The input/output interface 785 is configured to allow interactions between the computer 230 and other components such as the data capture apparatus 125 of the vehicle 105, the cloud computer 205, the computer system 220, and the storage device 215. More particularly, in an example implementation, the input/output interface 785 is configured to receive images and identifiers from various devices such as, for example, the data capture apparatus 125 as described above with respect to the sequence diagram 500.

The memory 237, which is another example of a non-transitory computer-readable medium, may be used to store an operating system (OS) 780, a database 775, and various code modules such as a data capture system module 770. The code modules are provided in the form of computer-executable instructions that can be executed by the processor 236 for performing various operations in accordance with the disclosure.

The database 775 may be used to store information such as, for example, images and identifiers obtained from the data capture apparatus 125.

The data capture system module 770 may be executed by the processor 236 for performing various operations in accordance with the disclosure, including, execution of some operations of the example sequence diagram 500 described above.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. More particularly, it must be understood that various operations described above with respect to the data capture apparatus 125 of the vehicle 105 can be executed by various other devices such as, for example, the computer 230 (and vice-versa). The computer 230 may execute these operations either independently, or in cooperation with the data capture apparatus 125.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device, such as the memory 127, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   initiating, by a vehicle, a data capture procedure that includes capturing of at least one image, the at least one image including an individual who is located outside the vehicle;
   generating, by the vehicle, an identifier for identifying the at least one image;
   generating, by the vehicle, a notification that includes the identifier; and
   conveying, by the vehicle, the notification, to the individual, to inform the individual of the at least one image.

2. The method of claim 1, wherein the identifier is a machine-readable symbol, and wherein the data capture procedure further includes operating at least one sensor for capturing data associated with at least one of the individual or an object located outside the vehicle.

3. The method of claim 1, further comprising:
   transmitting, by the vehicle, to a first cloud computer, the at least one image that includes the individual located outside the vehicle; and
   transmitting, by the vehicle, to at least one of the first cloud computer or a second cloud computer, the identifier.

4. The method of claim 3, further comprising:
   receiving, by the at least one of the first cloud computer or the second cloud computer, from a personal device, a request to one of delete the at least one image or provide information about the at least one image; and
   providing, by the at least one of the first cloud computer or the second cloud computer, a response to the request.

5. The method of claim 4, wherein the at least one image is a first image in a video clip and wherein the request includes a copy of the identifier.

6. The method of claim 3, wherein the at least one of the first cloud computer or the second cloud computer is configured to store the identifier in a distributed ledger, and wherein the method further comprises:
   providing, by the at least one of the first cloud computer or the second cloud computer, to a personal device of the individual, access to the identifier stored in the distributed ledger.

7. The method of claim 3, further comprising:
   displaying, by the vehicle, the notification on a display screen that is viewable outside the vehicle; and
   discontinuing, by the vehicle, displaying of the notification, upon termination of the data capture procedure.

8. A method comprising:
   initiating, by a vehicle, a data capture procedure that includes capturing of at least one image;
   generating, by the vehicle, upon initiating the data capture procedure, an identifier for at least one of requesting a deletion of the at least one image or requesting personal identity information contained in the at least one image;
   transmitting, by the vehicle, to a first cloud computer, the image containing the personal identity information; and
   transmitting, by the vehicle, to at least one of the first cloud computer or a second cloud computer, the identifier; and
   enabling, by at least one of the vehicle, the first cloud computer or the second cloud computer, public access to the at least one of the first cloud computer or the second cloud computer.

9. The method of claim 8, further comprising:
   generating, by the vehicle, a notification that includes the identifier;

displaying, by the vehicle, the notification on a display screen that is viewable from outside the vehicle; and discontinuing, by the vehicle, displaying of the notification, upon termination of the data capture procedure.

10. The method of claim 9, wherein the identifier is one of a quick response code or a barcode.

11. The method of claim 9, wherein the at least one of the first cloud computer or the second cloud computer is configured to store the identifier in a distributed ledger and wherein the distributed ledger is configured to be accessible by an individual.

12. The method of claim 8, further comprising:

conveying, by the vehicle, a communication that indicates that the data capture procedure is being executed, wherein the communication is configured to be received by an individual located outside the vehicle.

13. The method of claim 12, wherein the communication includes the identifier configured for use by the individual to request a deletion of the personal identity information of the individual that is contained in the at least one image.

14. The method of claim 12, wherein the communication is one of a visual communication or an audible communication.

15. A system comprising:

a vehicle, comprising:

a camera;

a display device having a display screen;

a data capture apparatus comprising:

a first memory that stores computer-executable instructions; and a first processor configured to access the first memory and execute the computer-executable instructions to perform operations comprising:

executing a data capture procedure that includes operating the camera to capture at least one image that includes an individual located outside the vehicle;

generating an identifier for identifying the at least one image;

generating a notification that includes the identifier; and conveying, by the vehicle, the notification, to the individual, to inform the individual of the at least one image.

16. The system of claim 15, wherein the identifier is a machine-readable symbol, wherein the display device is one of provided in a cabin area of the vehicle or mounted upon a body portion of the vehicle, wherein conveying the notification to the individual comprises displaying the notification on the display screen of the display device, and wherein execution of the computer-executable instructions further performs operations comprising:

discontinuing displaying of the notification upon termination of the data capture procedure.

17. The system of claim 15, further comprising:

a second computer comprising:

a second memory that stores second computer-executable instructions; and a second processor configured to access the second memory and execute the second computer-executable instructions to perform second operations comprising:

receiving, from the data capture apparatus, at least one of the identifier or the at least one image;

receiving, from a personal device of the individual, a request to one of delete the at least one image or provide information about the at least one image; and providing, to the personal device, a response to the request.

18. The system of claim 17, wherein the second computer is a cloud computer that is configured to store the identifier in a distributed ledger that is accessible by the individual.

19. The system of claim 18, wherein the first processor is configured to access the first memory and execute the computer-executable instructions to transmit to the cloud computer, the identifier in an encoded format.

20. The system of claim 15, further comprising:

a communication system configured to convey to the individual located outside the vehicle, a communication that indicates that the data capture procedure is being executed.

* * * * *